July 9, 1935.  W. E. SHARP  2,007,881
COMBINATION DRY CLEANING AND FLUID RECLAIMING MACHINE
Filed June 30, 1932
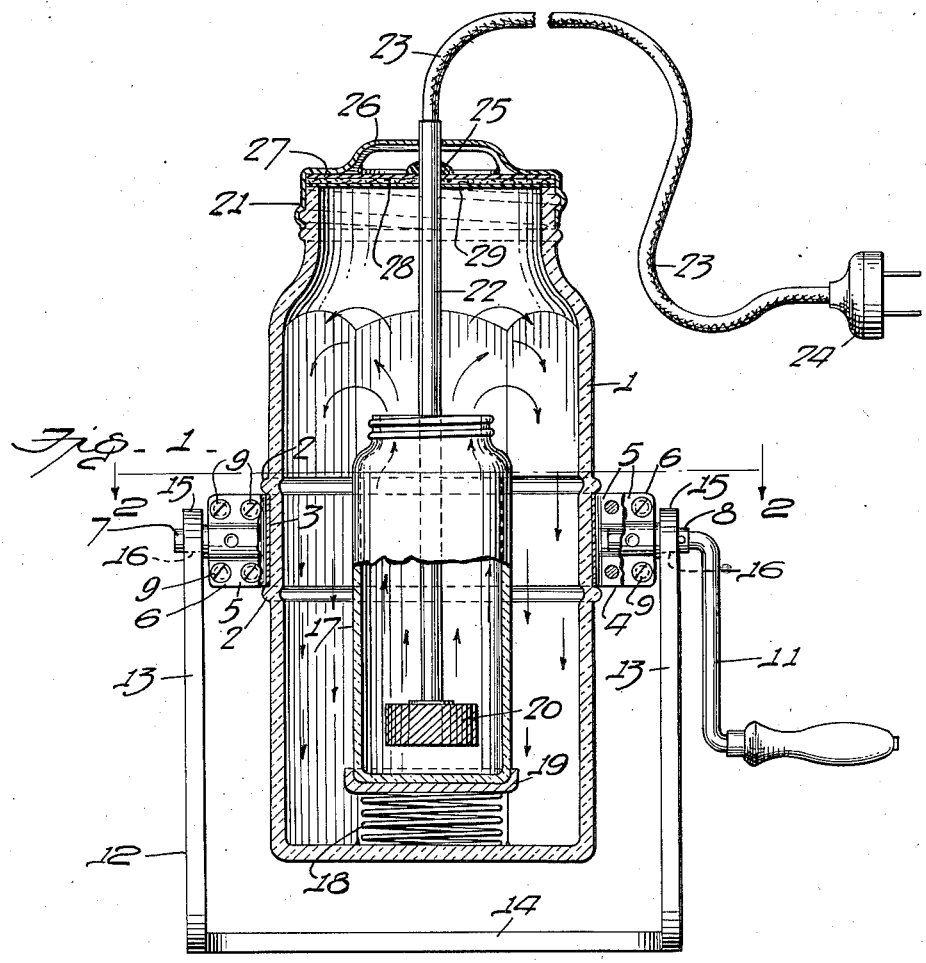
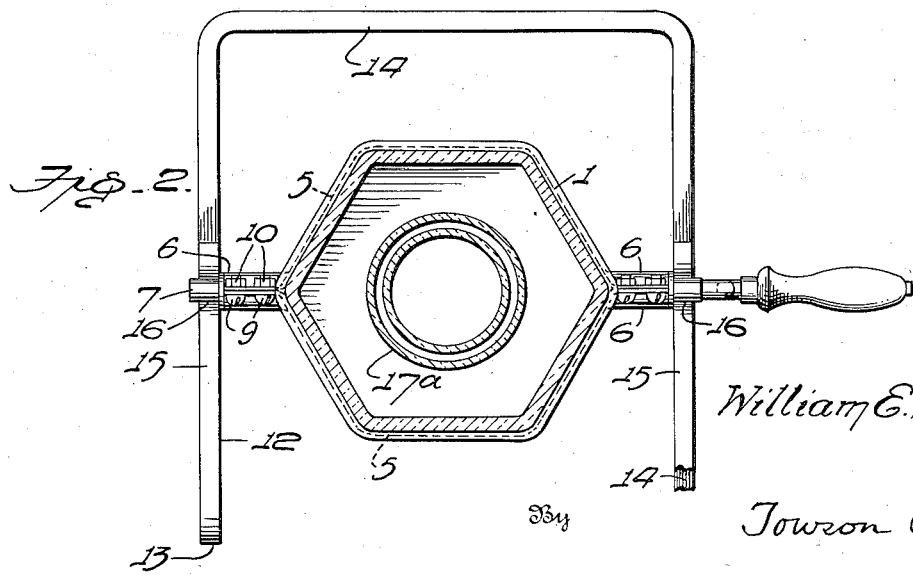
Inventor
William E. Sharp
By Towson Price
Attorney Patented July 9, 1935

2,007,881

UNITED STATES PATENT OFFICE 2,007,881

COMBINATION DRY CLEANING AND FLUID RECLAIMING MACHINE

William E. Sharp, Chicago, Ill.; Minnie E. Sharp, executrix of the estate of said William E. Sharp, deceased Application June 30, 1932, Serial No. 620,266

6 Claims. (Cl. 68—38)

This invention relates to a combination machine adapted for both dry cleaning operations and the reclamation or refining of the cleaning fluid used in such operations.

The principal object of my invention, generally considered, is the provision of a dry cleaning machine including a relatively large container adapted to be sealed, and a smaller container adapted for reception therein, said smaller container being adapted to receive dirty cleaning fluid and an electrical heating element for vaporizing said fluid out of the smaller container for condensation and reclamation in the larger container while the same is sealed from the atmosphere to prevent loss by evaporation.

Another object of my invention is the provision of a portable machine adapted for rectifying, cleaning, reclaiming or refining dry cleaning fluid used in home dry cleaning operations, said device comprising a preferably low-voltage, immersible heater received in an open container and both, when in operation, sealed in a larger container, said open container receiving the dirty dry cleaning fluid and the sealed container serving for condensing and collecting the reclaimed fluid.

A further object of my invention is the provision of apparatus for home use for dry cleaning operations and for subsequently reclaiming the dry cleaning fluid used in such operations by chemical and mechanical means.

Other objects and advantages of the invention relating to the particular arrangement and construction of the various parts will become apparent as the description proceeds.

Referring to the drawing illustrating my invention:—

Figure 1 is a vertical sectional view of apparatus embodying my invention.

Figure 2 is a sectional view on the line 2—2 of Figure 1, looking in the direction of the arrows, and showing a modified form of inner container for dirty cleaning fluid.

In my Patent No. 1,977,650, I have described and claimed a cleaning machine involving a transparent container adapted for holding a dry cleaner and articles to be cleaned, said container being rotatable, whereby said articles may be cleaned upon mere turning of the container and the progress of cleaning may be followed without opening said container.

In accordance with my present invention, I propose to use such and additional apparatus for the purpose of making a combined machine which is suitable not only for dry cleaning articles of clothing, but for subsequently reclaiming, vaporizing or refining the cleaning fluid which has become soiled in use in order to economize and decrease the expense of such cleaning operations which are suitable for being conducted in the home. With the foregoing in view, I have devised a combination cleaning and fluid reclaiming machine involving a relatively large container 1 which is preferably made of glass or transparent material so that the fluid and materials therein may be inspected without opening. Said container 1 is also desirably hexagonal in section, as shown in the drawing, so that agitation of the dry cleaner or cleaning fluid when the container is rotated is most effective for cleaning purposes.

In order to properly support the container 1 for rotation about a transverse axis, said container desirably has a pair of spaced parallel ribs 2 embossed in the glass thereof, as shown most clearly in Figure 1, said ribs encircling the container and being disposed on either side of the center of gravity thereof, thereby providing a groove 3 therebetween for receiving a supporting band 4. In the present embodiment, the band 4 comprises a pair of metal plates 5 adapted to encircle the container between the ribs 2 and formed with outstanding engaging end portions 6 embossed to encircle associated trunnions 7 and 8 and held in tight engagement therewith by means of bolts 9 and associated nuts 10, said bolts extending through the ends 6 of the metal plates 5 on either side of the embossed portions 11 thereof. The drive trunnion 8 is connected in any desired manner to a crank 11 for turning the bottle or container 1. The metal plates 6 forming the band 5 are desirably of such width that they snugly fit between the ribs 2 so that said container is tightly held therebetween.

For rotatively mounting the container or jar 1, a stand or base 12 with brackets 13 is provided, the stand being desirably constructed of a steel rod, square in section, bent to the desired shape, as shown in the drawing. Said steel rod, in the embodiment disclosed, is bent to form a three-sided rectangular base portion 14 with upstanding bracket portions 13, the upper ends of which have horizontal supporting portions 15, the ends of which are formed with notches 16 providing bearings for the trunnions 7 and 8.

Received in the relatively large container 1 is a relatively small preferably transparent or glass container 17 adapted for holding soiled or dirty cleaning fluid for the vaporization or reclamation thereof. A preferred size relationship between the containers 1 and 17 for some cleaning and reclaiming operations is that the container 1 may have the capacity of approximately one and one-half gallons, while the container 17 holds approximately two quarts, although I do not wish to be limited to these sizes. The inside container 17 should not rest directly on the bottom of the outside container, it being preferable to have it several inches from the bottom of the outside container in the preferred embodiment disclosed, and said inside container, therefore, rests upon a support 18 of any desired material not soluble in the fluid to be reclaimed. In the present embodiment, the support or cushion 18 is illustrated as a coil or helical spring, to the top of which is connected a cup 19, although I do not wish to be limited to this showing.

Received in the open inner jar or container 17 is an electric heating element 20 desirably supported from a screw cap 21 which serves to seal the outer container as by means of a brass or other insoluble rod 22 through which extends a flexible cord 23 serving to supply electrical energy to the heating element 20, the free end of said cord being desirably provided with a wall plug 24 for convenient connection with a commercial source of electric current.

Although a screw cap of conventional form may be employed for closing the container 1, said rod 22 being connected therewith by solder 25 or in any desired manner to make a tight joint, yet I prefer to employ a cap such as described in my Patent No. 1,977,650, previously referred to, so that the jar may be conveniently sealed and unsealed. Said cap, therefore, preferably has the upper surface pressed outwardly to form a handle 26 preferably angular or channel shape in section for stiffness. The formation of the handle from the top of the cap 21, of course, leaves apertures on either side thereof, and said apertures are normally closed by a flat plate of metal 27, to which the tube 22 is conveniently connected by solder 25, the handle being desirably apertured, as indicated at 28, for the passage of the tube therethrough. As an alternative, however, the tube may stop short of the handle 26 and the cord pass out under the handle.

The jar 1 is preferably closed by forcing the plate 27, associated felt pad 28, and tinfoil-faced pulpboard liner 29 into tight contact with the edge of the open end thereof by screwing on the cap 21 to the position shown most clearly in Figure 1. The felt pad is to furnish resiliency to compensate for any irregularity in the top of the container 1 and the tinfoil facing on the liner is to resist the action of the cleaning fluid or dry cleaner.

When operated as a cleaning machine, the cap 21, tube 22, heating element 20, inner jar 17, and supporting means 18 and 19 are removed from the container 1, which is partly filled with cleaning fluid and articles to be cleaned. Said container is then closed by a cap preferably similar to the cap 21, except that the metal disk 27, the felt pad 28, and the associated pulpboard liner 29 are imperforate rather than apertured for the reception of a tube. The container 1 is then rotated by turning the crank 11 for a few minutes until the clothing is cleaned. Upon removal of the clothing, the dirty cleaning fluid, if it is then desired to vaporize and refine it, is poured into the smaller jar 17. Into this dirty cleaning fluid is placed a small quantity of baking soda, such, for example, as a heaping tablespoonful. The small jar 17 is then inserted in place, through the opening or top of the large jar 1, with the immersible heating element 20, cap 21, and other parts, all as shown in Figure 1. The heating element 20 is connected to a source of electricity by the plug 24 and the fluid surrounding it is vaporized out of the jar 17 and condensed and collected by and in the outer jar or container 1, which on account of it being held in elevated position by the stand 12, is well adapted to be kept relatively cool by the surrounding air, as will be understood. The baking soda serves to neutralize any acid in the dirty cleaning fluid, so that the fluid that is collected in the large container 1 is in a pure and refined condition and adapted for reuse without further treatment.

The heating element 20 is of such capacity as compared with the size of the jars 1 and 17 that the dry cleaner, which is preferably a volatile, low boiling point, solvent liquid of a noninflammable character, is vaporized at a rate sufficient to throw the vapor over the top of the inside container so that it circulates on the inside of the larger container, and so that the heat transfer of the walls of the outside container is sufficiently rapid to condense it to liquid form. The rate of heat transfer of the inside container 17 will not be sufficiently great to increase the temperature of the space between the two containers to a point that the vapor will not liquefy when using the proper size of heating element, such, for example, as a 75 watt immersion type of heater with a large container of one and one-half gallon capacity and a small container of two quart capacity. The rate of heat transfer from the inner container to the outer container may be further reduced, if desired, making it possible to use a smaller heating unit, or increase the rate of vaporization with the same heating unit, by increasing the insulating properties of the walls of the small container, as by using a double walled glass container 17a, as shown in Figure 2. A substantial vacuum may be formed in the space between the inner wall and the outer wall of said container 17a, if high heat insulating properties are desired. Although I have mentioned baking soda as a suitable substance for mixing with the dirty cleaning fluid for neutralizing any acid which may be formed due to chemical reaction of moisture with the cleaning fluid, or from any other cause, it will be understood that any similar mild alkali may be employed instead of baking soda.

The heating element 20 is desirably selected and designed from the standpoint of safety so that when in use it does not reach a red heat at any time and, therefore, may be operated indefinitely in the open air or in place in the inner container, making it unnecessary to watch the reclaiming process or use a thermostatic or fuse control. The heater may be placed at any point in the liquid, but the preferable position is near, but not closer than one-fourth of an inch from, the bottom of the inside container, as this gives the greatest efficiency and does not permit the distilling over of low boiling point oils that might be contaminating the fluid to be cleaned. For the same reason, it is preferably short, or the vertical dimension small, as shown, compared with its diameter or horizontal dimensions.

The clearance space between the top of the inside container and the closed top of the outside container should be sufficient so that the vapors are allowed to freely travel over the top of the inside container.

After the vaporizing operation is complete, the reclaimed fluid will be in the bottom of the larger container 1, and the current to the heater 20 may be shut off. The apparatus may then be allowed to cool, the large container unsealed, and the small container, together with the accessories, removed. The reclaimed fluid left in the bottom of the large container is then in position for reuse for cleaning articles of clothing, or the like.

From the foregoing description taken in connection with the accompanying drawing, it will be seen that I have devised a cleaning machine which, although particularly adapted for dry cleaning clothing is not limited to such use, and which may be readily manufactured and assembled. The machine with the accessory parts such as the inner container, the support for the inner container, the immersible heating unit, and the screw cap which serves the double function of supporting the heating unit and sealing the outer container is then suitable for reclaiming the same fluid which is used in the dry cleaning operation. It will be understood that, as a matter of safety, the dry cleaning fluid used in the machine should be of a non-inflammable and non-explosive type. It will also be understood that by virtue of the vaporization being conducted in a sealed container at a very moderate rate, the loss during the reclaiming operation is insignificant, while at the same time no danger results due to increase in pressure in the large container during the refining operation.

Although a preferred embodiment of my invention has been illustrated, it will be understood that modifications may be made within the spirit and scope of the appended claims, and that the terms employed are used for purposes of description and are not terms of limitation. It will also be understood that although glass is designated as a preferred material for forming the large and small containers, I do not wish to be limited to the use of such material, as metal or other substances may be employed instead, if desired.

I claim:—

1. In a combination dry cleaning and fluid reclaiming machine, a container for cleaning fluid and articles to be cleaned, means for supporting said container, a smaller container disposed inside of, and opening into, said first-mentioned container, when the apparatus is used for fluid reclaiming, for holding mild alkali and cleaning fluid to be reclaimed, means for supporting said smaller container above and spaced from the bottom of the first-mentioned container, an electrical heating element, means supporting said heating element in and above the bottom of said smaller container, means for tightly closing the first-mentioned container, and means for conducting electricity to said heating element.

2. In a combination dry cleaning and fluid reclaiming machine, a container for cleaning fluid and articles to be cleaned, a smaller container supported inside of, and opening into, the first-mentioned container when the apparatus is used for fluid reclaiming, said second container being adapted to hold cleaning fluid to be reclaimed, an electrical heating element, short as compared with its horizontal dimensions, adapted for reception in the smaller container, means for closing the first-mentioned container, means for supporting said heating element from the closing means for the first-mentioned container so that it is disposed in, and above the bottom of, the smaller container, and means for conducting electricity to said heating element for vaporizing fluid in the smaller container for condensation in said first-mentioned container.

3. In a machine for conducting dry cleaning operations, a relatively small container, an immersible heater supported therein, a relatively large sealed container surrounding said small container and heater, means for supporting said small container above and spaced from the bottom of the sealed container with the former opening into the latter, means for supporting the heater above the bottom of the open container, and means for conducting energy to said heater.

4. Dry cleaning apparatus comprising a relatively large container for dry cleaning fluid, a relatively small container spaced from the bottom of, opening into, and enclosed in the large container, said small container being adapted for holding dry cleaning fluid intended to be reclaimed, a heating element for vaporizing the fluid from the smaller container, means for closing the larger container to avoid loss of the dry cleaning fluid during the vaporizing process, means for supporting the heater from the closing means, and means for conducting energy to said heater.

5. Dry cleaning apparatus comprising a relatively large transparent container, a smaller transparent container inside of, and opening into, said first container, a supporting cushion spacing the smaller and larger containers, a cap for closing the larger container, an electrical heating element in the smaller container, means for suspending said heating element in place from said cap, and means for conducting electricity through said suspending means to said heater.

6. In combination, dry cleaning apparatus comprising a container adapted for holding cleaning fluid and articles to be cleaned, a smaller container enclosed in, spaced from the bottom of, and opening into, the larger container, and a heating element in said smaller container adapting it to function as a vaporizer, while the larger container functions as a condenser for reclaiming the cleaning fluid after use for dry cleaning purposes.

WILLIAM E. SHARP.